(12) United States Patent
Rogers

(10) Patent No.: US 11,625,023 B2
(45) Date of Patent: Apr. 11, 2023

(54) DEVICE AND METHOD FOR AUTOMATED ASSEMBLY OF INTERLOCKING SEGMENTS

(71) Applicant: Donald Scott Rogers, Lafayette, LA (US)

(72) Inventor: Donald Scott Rogers, Lafayette, LA (US)

( * ) Notice: Subject to any disclaimer, the term of this patent is extended or adjusted under 35 U.S.C. 154(b) by 942 days.

(21) Appl. No.: 16/501,469

(22) Filed: Sep. 29, 2018

(65) Prior Publication Data
US 2020/0166915 A1 May 28, 2020

Related U.S. Application Data

(60) Provisional application No. 62/565,496, filed on Sep. 29, 2017.

(51) Int. Cl.
| | | |
|---|---|---|
| G05B 19/418 | (2006.01) | |
| B23P 21/00 | (2006.01) | |
| B25J 9/00 | (2006.01) | |
| B25J 9/16 | (2006.01) | |
| B23P 19/10 | (2006.01) | |

(52) U.S. Cl.
CPC ........ *G05B 19/41805* (2013.01); *B23P 19/10* (2013.01); *B23P 21/00* (2013.01); *B25J 9/0096* (2013.01); *B25J 9/1697* (2013.01); *G05B 2219/31368* (2013.01); *G05B 2219/39001* (2013.01); *G05B 2219/39466* (2013.01)

(58) Field of Classification Search
CPC ......... B25J 9/0096; G05B 2219/45064; G05B 19/41805; B23P 21/002; B23P 21/00
See application file for complete search history.

(56) References Cited

U.S. PATENT DOCUMENTS

| | | | | |
|---|---|---|---|---|
| 4,163,183 A | * | 7/1979 | Engelberger | F16H 9/10 318/568.18 |
| 4,707,647 A | * | 11/1987 | Coldren | G06V 10/955 382/199 |
| 5,239,739 A | * | 8/1993 | Akeel | B62D 65/02 29/430 |
| 6,163,946 A | * | 12/2000 | Pryor | B25J 9/1697 29/702 |
| 6,360,421 B1 | * | 3/2002 | Oatridge | B62D 65/02 29/469 |
| 6,389,698 B1 | * | 5/2002 | Malatier | B62D 65/00 29/466 |
| 7,073,662 B2 | * | 7/2006 | Neely | B65G 17/06 198/852 |
| 7,650,679 B2 | * | 1/2010 | Bidaud | B25J 9/0093 901/41 |
| 8,636,141 B2 | * | 1/2014 | Neely | B65G 17/086 198/853 |
| 8,720,676 B2 | * | 5/2014 | Neely | B65G 17/385 198/853 |
| 8,752,698 B2 | * | 6/2014 | Lasecki | B65G 17/083 198/853 |

(Continued)

*Primary Examiner* — Michael W Hotchkiss

(57) ABSTRACT

A device and method for automated computer controlled manufacture of assemblies composed of discrete linked product segments includes reciprocating product segment grippers having surface features engageable with the product segments, at least one robotic manipulating device whereby the product segments may be engaged by the product segment grippers.

16 Claims, 7 Drawing Sheets

(56) References Cited

U.S. PATENT DOCUMENTS

| | | | | |
|---|---|---|---|---|
| 9,027,231 | B2 * | 5/2015 | Mimura | B25J 21/00 |
| | | | | 29/721 |
| 9,120,221 | B2 * | 9/2015 | Nakasugi | B23P 21/00 |
| 10,108,186 | B2 * | 10/2018 | Klumpp | B23P 21/004 |
| 10,941,834 | B2 * | 3/2021 | Ulchak | F16G 3/10 |
| 2009/0158577 | A1 * | 6/2009 | Schweikle | B23P 21/002 |
| | | | | 29/428 |
| 2010/0287767 | A1 * | 11/2010 | Woo | B23K 37/0435 |
| | | | | 29/823 |
| 2015/0343643 | A1 * | 12/2015 | Kiyosawa | B25J 9/1697 |
| | | | | 901/30 |
| 2016/0288280 | A1 * | 10/2016 | Lin | B25J 9/0096 |
| 2019/0160610 | A1 * | 5/2019 | Reid | B25J 5/02 |
| 2020/0119372 | A1 * | 4/2020 | Kim | H01M 8/241 |
| 2020/0254574 | A1 * | 8/2020 | Nakano | B23P 21/002 |
| 2021/0018893 | A1 * | 1/2021 | Jurkovic | G05B 19/402 |

* cited by examiner

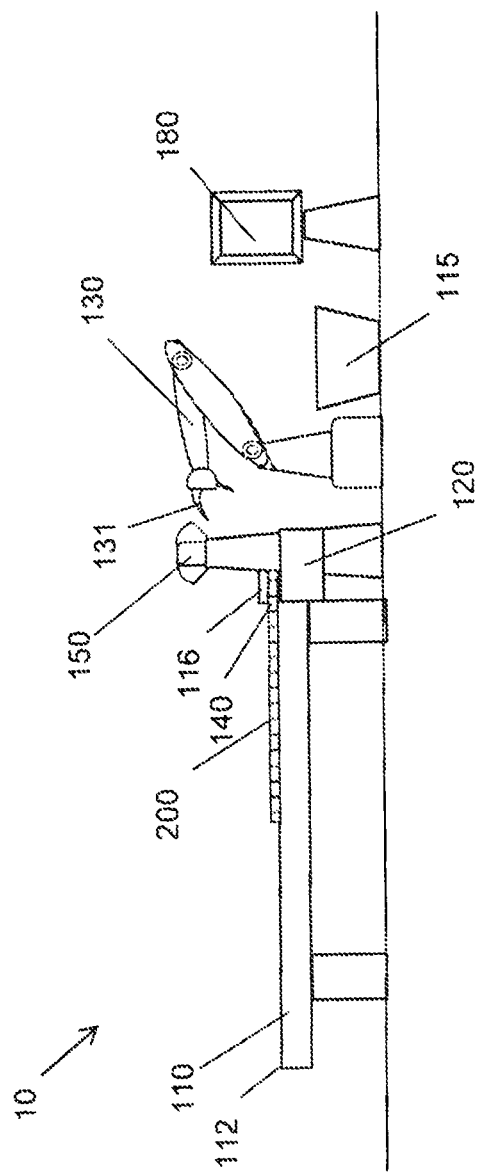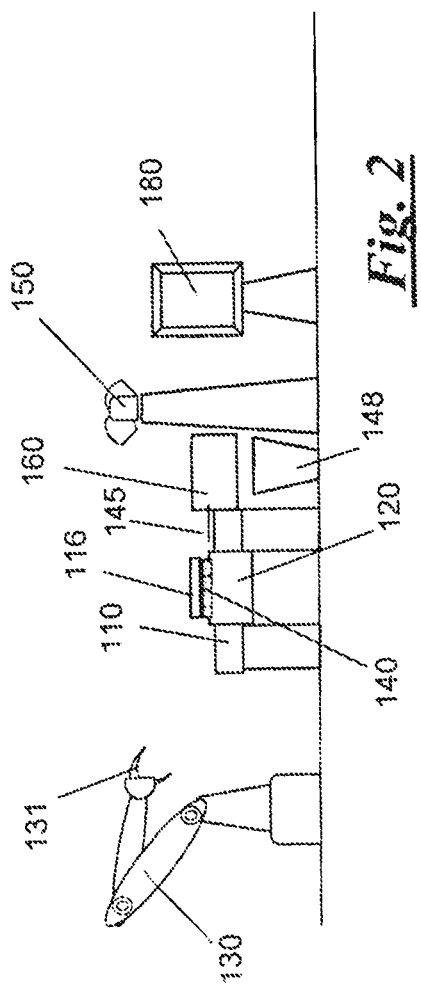

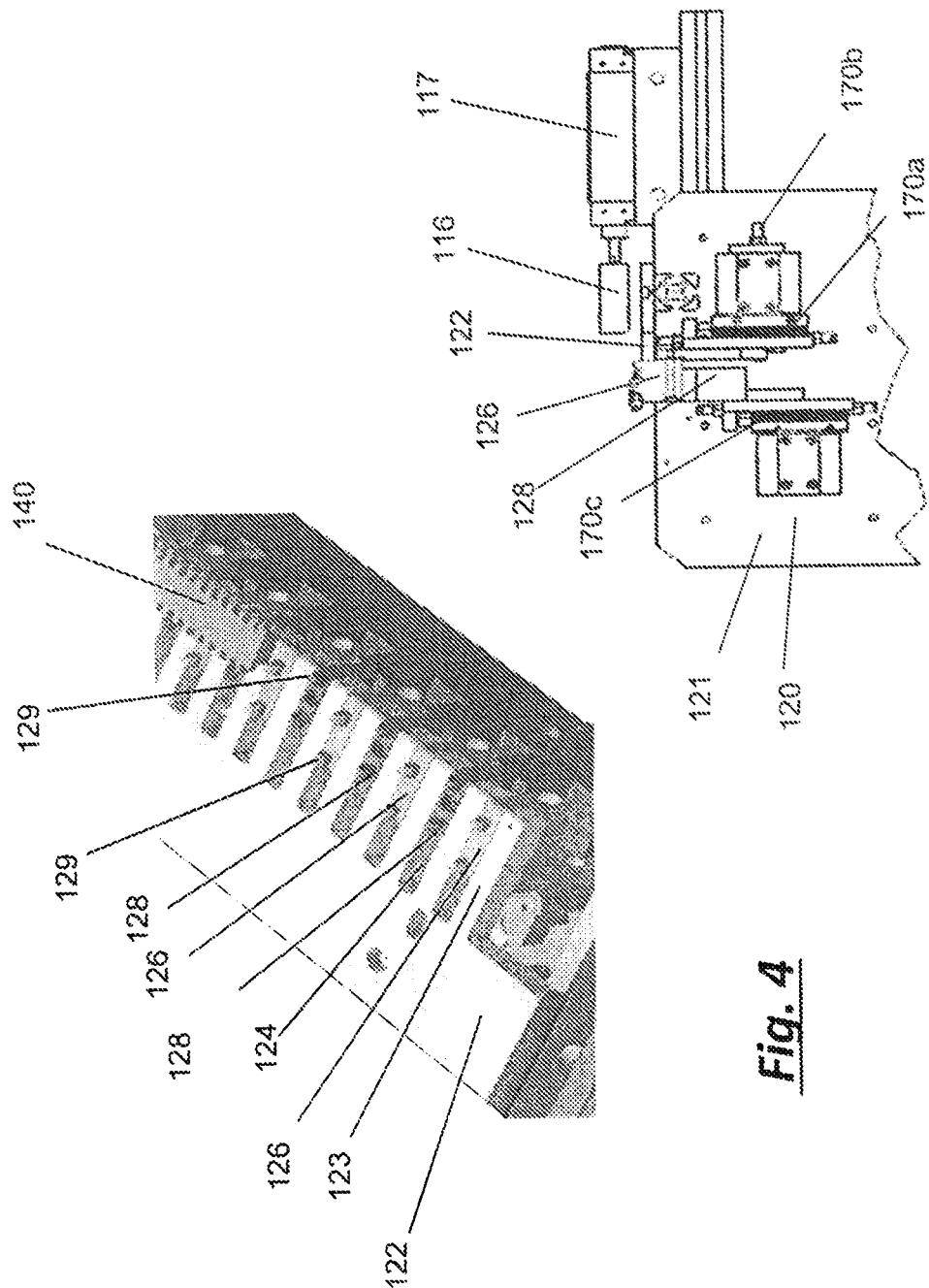

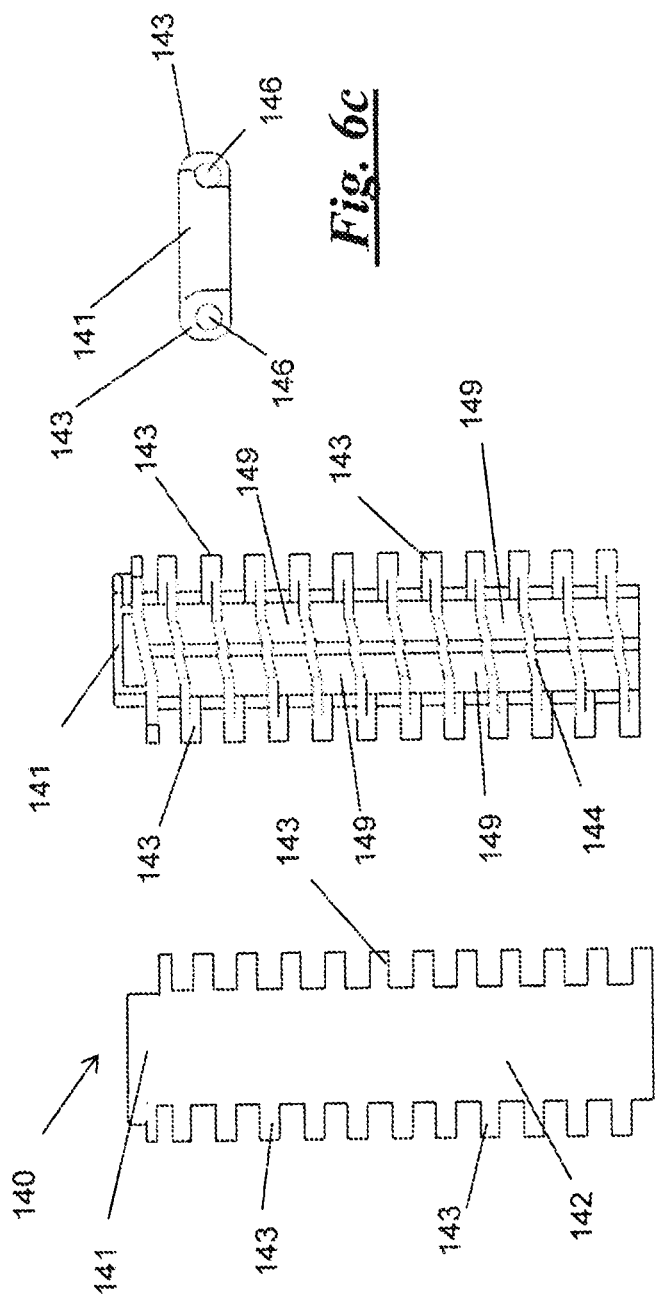

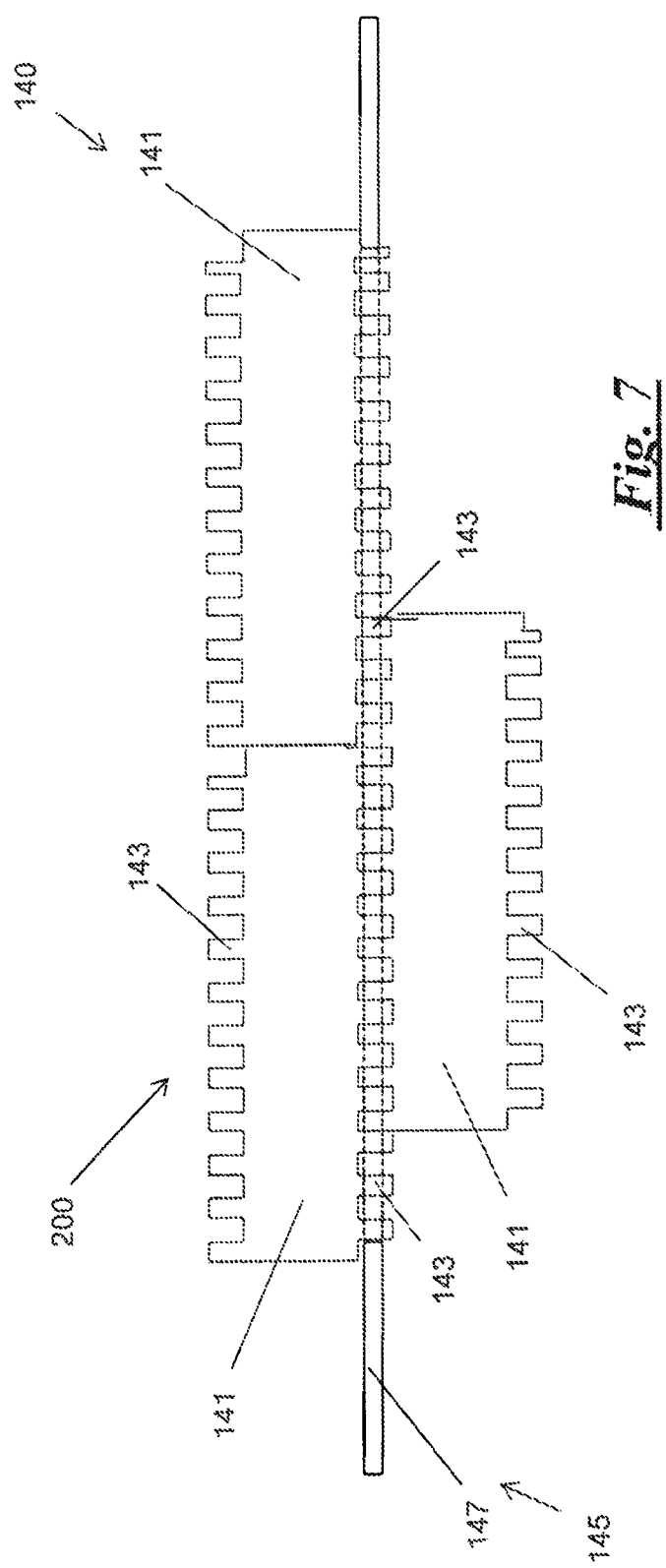

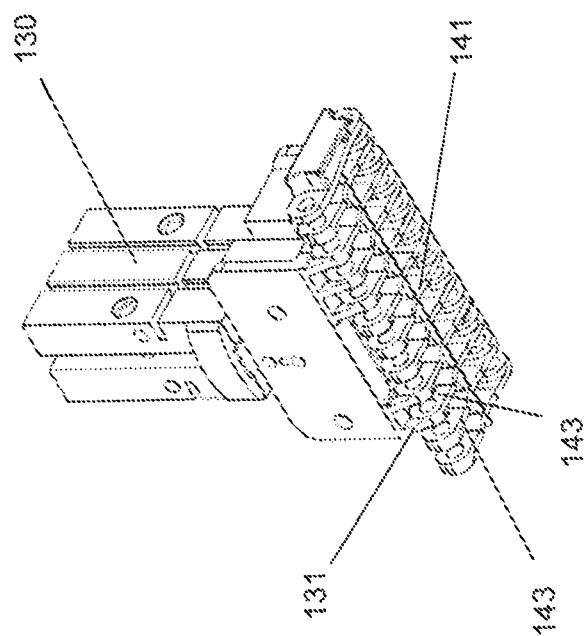
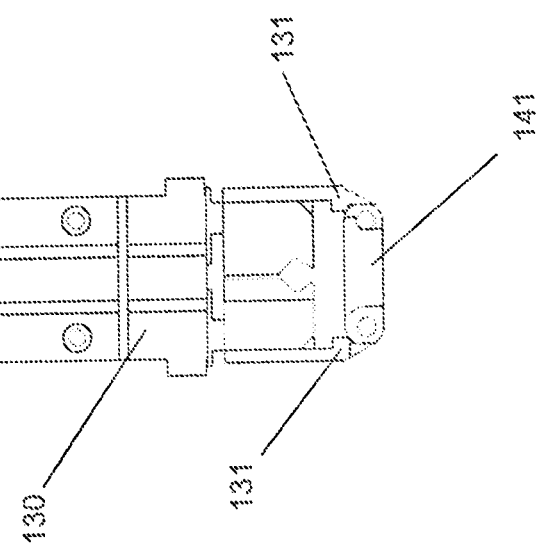
Fig. 8b
Fig. 8a

ASSEMBLY METHOD

DEVICE AND METHOD FOR AUTOMATED ASSEMBLY OF INTERLOCKING SEGMENTS

PRIORITY

This application claims priority to U.S. Provisional Application Ser. No. 62/565,496 filed Sep. 29, 2017 for "Device and Method for Automated Assembly of Interlocking Segments", the entire content of which is incorporated by reference.

FIELD OF INVENTION

The subject invention relates to a device and method for computer controlled robotic selection and assembly of desired component parts for automated manufacture of assemblies comprised of interlocked components, such as the components of a link-style conveyor belt.

BACKGROUND OF INVENTION

Assembly of modular interlocked or interleaved components into products such as link-style or hinged-segment conveyor belt has heretofore required a problematic degree of human intervention. In some assembly applications, the selection and assembly of the linked or interlocked components of the conveyor belt is done entirely by hand. Such human intervention, both in recognition and handling of the required components, and assembly of the required components into a finished product, id typically lower, less efficient, more error-prone, and substantially more expensive than if all or a portion of the component selection, handling, and assembly is conducted by automation.

By way of example, one application of the subject invention involves devices and methods for assembling modular link-style conveyor belts from a plurality of modular plastic components. Such link-style conveyor belts typically utilize a plurality of adjacent injection-molded plastic link segments, each having a plurality of hollow knuckle sections that tire linked or hinged together at the knuckle sections by interlocking segments such as pins or rods to form a hinge interlock between the adjacent link segments. Modular plastic link-style conveyor belts have significant advantages over conventional woven, rubber or other flat belts because they require little maintenance and are easy to clean and repair. A disadvantage of such modular plastic link-style conveyor belts has been in their manufacturing complexity, as the modular components of such conveyor belts are often not identical or readily identifiable and these modular components are more likely than not joined or linked together at short (scale of inches) intervals.

While the components of modular plastic link-style conveyor belts can be pre-fabricated in large quantities from light, inexpensive, non-reactive, and tough materials such as injection-molded plastics, assembly of a link-style bell conveyor from these modular components presently requires supplying the various different link segment types in the correct quantities, selecting an appropriate link segment type, assembling the provided link segments in the appropriate order precisely (tolerances in millimeters), and joining or linking the selected link segment types together with interlocking segments such as pins or rods to create a hinge interlock between the selected components, either in step-wise fashion or by inserting an interlocking pin or rod through an entire "row" of adjacent link segments at once.

At worst, in the prior art, all of these tasks are carried out manually: a worker must be supplied with containers of variety of conveyor link segment types use in assembly of a desired conveyor belt or other product; supplied with a large, flat work surface; select and pull appropriate conveyor link segment types from the containers; place the knuckle sections of the selected link segment types together in adjacent straight or cascading rows (depending on desired product); insert interlocking pins or rods through the knuckle sections of the adjacent link segment types by hand, one-by-one, or through an entire "row" of link segment, in order to hinge or link the adjacent link segments together; and then fold or pile the growing links of link segments of the conveyor belt or other product into a holding bin or onto the work floor.

While width and desired length of the (typically endless or self-joined) conveyor belt or other product vary, two factors impose unavoidably high labor demands on the assembly process. First, a conveyor belt or other product will invariably require a high frequency (often no less than approximately every inch) of hinge interlocks in order to accommodate the often-narrow radii of conveyor-drive systems and minimize shear forces on any individual segment or row of segments. Second, in order to provide conveyor belts of varying widths, manufacturers employ or require belts comprised of standardized link segments or segments having a maximum width—such as 4 to 6 inches—to enable creation of conveyor belts with a width of a desired multiple of that maximum link segment width. Consequently, the manufacture of a conveyor belt about two feet wide employing 4-inch link segments or segments, then, may require each "row" (assuming link segments or segments of equal length) to include 6 segments, multiplying the labor required accordingly. Moreover, belt conveyors do not in every application employ a conveyor bell comprised of link segments or segments of equal length (or width); particular desired load, speed, or path (torsion or incline) requirements might dictate interweaving of two or more types of link segments or segments which must be interlocked in cascade or staged fashion. Such construction will by necessity increase the time and labor and thus the cost of manufacture of the conveyor belt.

Considering the foregoing, a need exits for automation of one or more aspects of assembly of link-style conveyor belts and similar products comprised of interlocking, hinged segments. Automation will reduce the cost of manufacture, serve to reduce the incidence of human error, and provide for more flexible, faster, and better-tailored solutions for the manufacturing of interlocked products such as link-style conveyor belts. These advantages, in turn, apply to a very wide variety of product applications—virtually any manufacturing, packaging, distribution, sorting, shipping, or similar industry employs belt conveyors or similar products or devices as an integral component of their process flow.

SUMMARY OF INVENTION

The present invention discloses a device for computer controlled robotic selection and assembly of desired component parts for automated manufacture of assemblies comprised of a plurality of interchangeable component parts or segments of a product that are to be interlocked together to produce a desired product and methods for utilizing the device for manipulation of desired component parts of the product to be manufactured. The device and method allows automated selection and identification of desired interchangeable component parts or segments of a product having a variety of surface geometries, manipulating the selected component parts to a desired position, and insertion of an interlocking segment in order to hinge or link the selected components together and thereby quickly and easily create a final product, such as a link-style conveyor belt, according to programmed output requirements.

The device is comprised of an assembly table; one or more segment containers containing a plurality of interchangeable component parts or segments of a product to be manufactured; one or more robotic manipulator arms for selecting and manipulating desired product component parts selected from the segments containers: a machine vision device for verifying the identity of the selected product component parts; one or more traction grippers mounted on the surface of the assembly table for receiving a plurality of selected product component pans from the robotic manipulator arms and holding them in place; a fastener-insertion device whereby interlocking segments are placed or inserted to link or connect the selected product component parts together; and a computer operated control mechanism for controlling the robotic manipulator arms, the machine vision device, the fastener-insertion device. The device and methods of the present invention will replace the large, flat work surface and live manual part selection and assembly currently utilized in the assembly of products, such as a link-style conveyor belts.

DESCRIPTION OP THE DRAWINGS

FIG. 1 is a schematic side view of the automated assembly device of the invention described herein.

FIG. 2 is a schematic end view of the automated assembly device of the invention described herein.

FIG. 4 is a detail partial isometric top view of the arrangement of the guide plate and stanchions of the traction gripper module of the automated assembly device of the invention described herein.

FIG. 5 is a partial side cross-section view of the traction gripper module of the automated assembly device of the invention described herein cut along Section-A of FIG. 3.

FIGS. 6a, 6b, and 6c show an embodiment of a product segment configured as conveyor link segment for use with of the automated assembly device of the invention described herein.

FIG. 7 is a schematic top view of a plurality of exemplar interchangeable product segments interlocked with an interlock rod by the automated assembly device described herein.

FIGS. 8a and 8b show partial detailed views on an embodiment of the robotic manipulator arm with opposing gripping fingers of the automated assembly device of the invention described herein.

Figure 9:
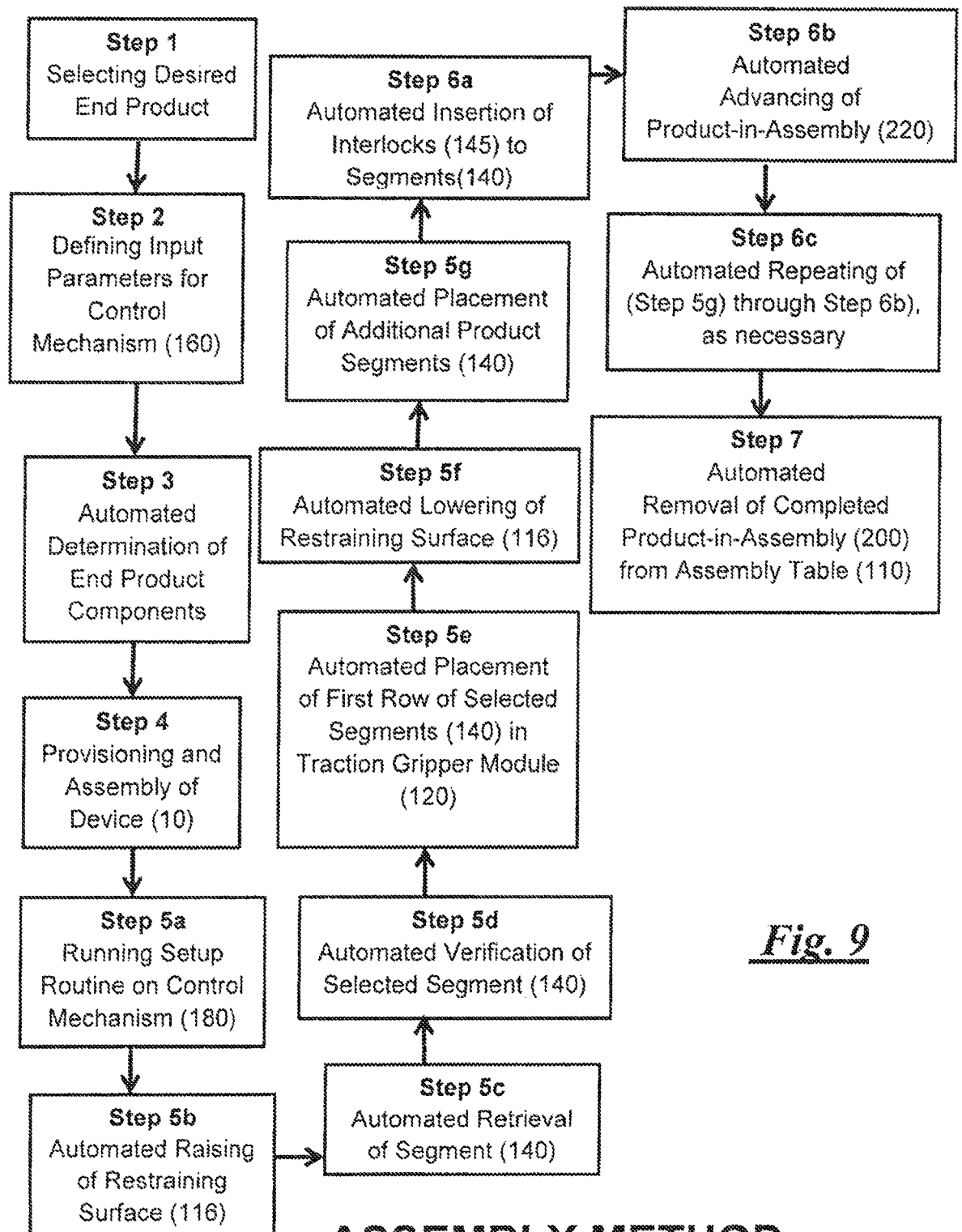

FIG. 9 is a diagram illustrating the method steps for assembly of a finished product with the automated assembly device described herein.

DESCRIPTION OF EMBODIMENT

FIGS. 1 and 2 show schematic views of live automated assembly device (10) for assembly of interchangeable component parts or product segments (140) of a product such as a link-style conveyor belt that are to be interlocked together to produce a desired product. The device (10) is comprised of an assembly table (110), one or more robotic manipulator arms (130) having gripping fingers (131) for selecting, manipulating, and placing a desired product segment (140) selected from a source of desired product segments (140) such as from segment containers (115) or from product segments (140) delivered by a conveyor or other similar mechanism, at least one machine vision device (150) for verifying the identity of the selected product segment (140); at least one traction gripper module (120) at least one fastener-insertion device (160) whereby fasteners referred to generically as interlocks (145) obtained from an interlock container (148) are engaged with the selected product segments (140); and a computer control mechanism (180) for operating and the controlling the traction gripper module (120); the robotic manipulator arms (130), the machine vision device (150), and the fastener-insertion device (160).

Figure 3:
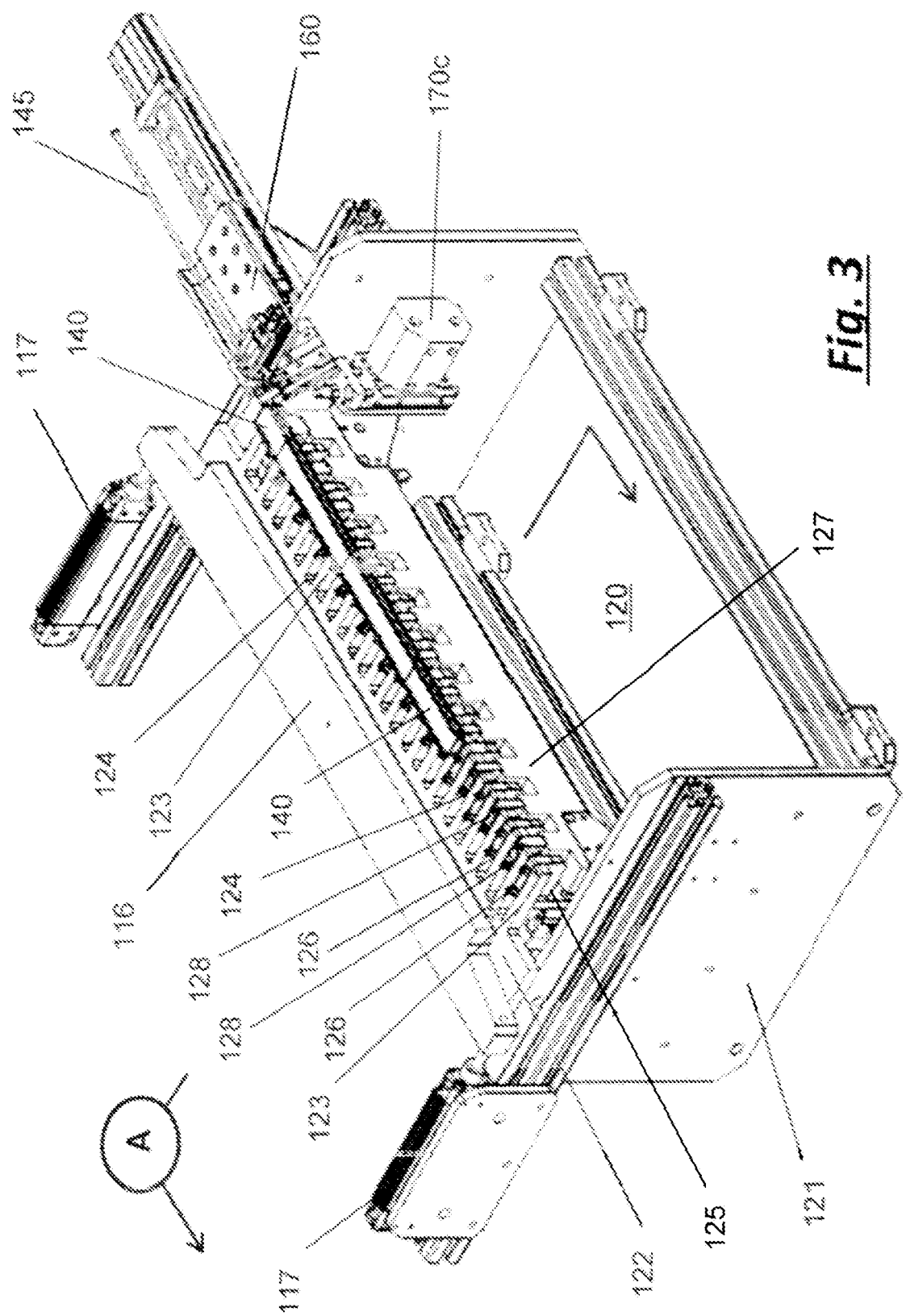
FIG. 3 is an isometric top view of the traction gripper module of the automated assembly device of the invention described herein.

As shown in FIG. 3, the traction gripper module (120), has a housing (121) positioned at the upper surface (112) at the end of the assembly table (110). The housing (121) of the gripping module (120) may be freestanding, on a stationary support, or be mounted to the table (110). Attached to the housing (121) is a guide plate (122) having a plurality of spaced apart guide fingers (123) forming a grip guide (124) between each of the guide fingers (123). A first product segment gripper (125) having a plurality of stanchions (126) each stanchion positioned in alternating grip guides (124). A second product segment gripper (127) also having a plurality of stanchions (128) each stanchion positioned in alternating grip guides (124) so that a stanchion (126) alternates with a stanchion (128). A pair of opposing studs (129) protrudes from the top of each stanchion (126) and stanchion (128). The guide plate (122), the alternated stanchions (126) and (128) with their opposing studs (129) of the traction gripper module (120) are shown in more detail in FIG. 4, a partial detail view of the arrangement of the guide plate (122) and stanchions (126) and stanchions (128) within the housing (121) of traction gripper module (120).

In the embodiment shown in FIGS. 3 and 4, the opposing studs (129) at each stanchion (126) are offset from the studs (129) on the adjacent stanchion (128) in order to facilitate placement of a desired product segment (140). The opposing studs (129) of each stanchion (126) and stanchion (128) may be placed in any suitable arrangement including in parallel rows depending upon the particular product segment (140) being utilized.

The traction module (120) may be further comprised of a retractable longitudinally and vertically positionable restraining surface (116) placed to overlay product segment gripper (125) and its corresponding stanchions (126) and product segment gripper (127) and its corresponding stanchions (128) dining assembly and interlocking of the product segments (140). The restraining surface (116) may be used to ensure that the selected product segments (140) do not buckle upwards or lose contact with stanchions (126) and stanchions (128) and their respective studs (129). The restraining surface (116) may also extend over the upper surface (112) of the assembly table (110). The restraining surface (116) may be adjustably moved to reciprocate longitudinally or vertically, upwards or downwards, as desired to accommodate selected product segments (140) of different height and/or a product-in-assembly (200) comprised of multiple layers of selected product segments (140). The movement of the restraining surface (116) to a desired position may be performed by at least one restraining surface actuator (117) operated and controlled by computer control mechanism (180). Actuator (117) may be any suitable mechanism for vertical movement and/or longitudinal movement including mechanically or electrically operated actuators, screw mechanisms, or hydraulically or pneumatically operated actuators.

As shown in FIG. 5, the first product segment gripper (125) is mounted on the housing (121) with a reciprocating mechanism (170a) to selectively move product segment gripper (125) and its corresponding stanchions (126) both vertically, upward and downward within its corresponding grip guide (124) independent of second product segment gripper (127), and a reciprocating mechanism (170b) to move product segment gripper (125) and its corresponding stanchions (126) longitudinally, within its corresponding grip guide (124) along the guide fingers (123). The second product segment gripper (127) is mounted on the housing (121) with a reciprocating mechanism (170c) to selectively move product segment gripper (127) and its corresponding stanchions (128) vertically, upward and downward within its corresponding grip guide (124) independent of first product segment gripper (125). The reciprocating mechanisms (170a), (170b) and (170c) may be any suitable actuator mechanism such as electrical, mechanical, hydraulic, or pneumatic linear actuators. Preferably pairs of reciprocating mechanisms (170a), (170b) and (170c) will be used in order to maintain alignment of the product segment grippers (125) and (127) within the housing (121) as they are reciprocated.

The computer control mechanism (180) will be use to operate the reciprocating mechanisms (170a), (170b) and (170c) and thereby manipulate product segment gripper (125) and its corresponding stanchions (126) to move vertically and longitudinally and manipulate product segment gripper (127) and its corresponding stanchions (126) to move vertically, upward and downward, as may be required or desired. Such manipulation allows adjustment for variation in the geometry of the selected product segments (140) due to manufacturing inconsistency or use of different materials.

The product segment grippers (125) and (127) may be detachably mounted to the respective reciprocating mechanisms (170a), (170b) and (170c) such as by a snap lit or by threaded bolts or screws in the manner of replaceable cartridges so that they may be replaced with product segment grippers (125) and (127) having a different configuration for the studs (129) depending upon the product-in-assembly being manufactured. Similarly, stanchions (126) and (128) may have sockets where the respective product segment grippers (125) and (127) may be detachably mounted or detachably mounted by other suitable attachment and detachable mechanisms such as threaded bolts or screw in order to install stanchions with a different configuration of studs (129) as may be required. Configuring the product segment grippers (125) and (127) as attachable and detachable cartridges will allow these components to be readily-repaired or replaced to accommodate different product designs or requirements with minimal downtime.

In instances where the product-in-assembly (200) is link-style conveyor belt, the selected product segments (140) will typically be a conveyor link segment (141) an embodiment of which is shown in in FIGS. 6a through 6c and the interlock (145) will be an interlock rod (147) such as that as shown in FIG. 7. Conveyor link segment (141) will have a link top surface (142), a link bottom surface (144), and link knuckles (143) each having with a bore (146). Conveyor link segment (141) will also have a sprocket indentations or recesses (149) for engaging the cogs or teeth of a sprocket-wheel of a conveyor. The arrangement of the studs (129) of the product segment grippers (125) and (127) will be configured so that the studs (129) will engage with the sprocket recesses (149) of the conveyor link (141). As shown in FIG. 7, during operation of the device (10) are interweaved with the link knuckles (143) of adjacent conveyor link segments (141) aligned so that fastener-insertion device (160) may engage interlock rod (147) with the aligned link knuckles (143) in order to link or connect the conveyor link segments (141) together. Such interlock rods (147) will typically be flexible rods having a length that matches (or slightly exceeds) the width of the product-in-assembly (200). Fastener-insertion device (160) is configured to insert and engage the interlock rods (147) with the link knuckle (143) of adjacent selected conveyor link segments (141) incremental steps or through the link knuckles (143) of an entire row of adjacent selected conveyor link segments (141).

The interlock rods (147) are configured for automated insertion through the link knuckles (143) of the selected conveyor link segments (141) by fastener-insertion devices (160). The fastener-insertion device (160) will typically be located in a fixed position, relative to the assembly table (110) to facilitate insertion of the interlock rods (147). Fastener-insertion devices (160) are well-known in the art. The interlock rods (147) comprising the interlocks (145) may thus be inserted either through the link knuckles (143) of an entire row of adjacent conveyor link segments (141) at once, or incrementally in a staggered or "cascade" fashion as the product-in-assembly (200) is moved along the length of the assembly table (110).

The robotic manipulator arms (130) will be used for selecting, manipulating, orienting, and placing for selecting, manipulating, and placing a desired product segment (140), such as a link segment (141), for engagement with the stanchion studs (129) of a desired stanchion (126) or (128) of product segment grippers (125) and (127), respectively. Gripping fingers (131) on the robotic manipulator arms (130) will engage and hold a desired product segment (140), such as a conveyor link segment (141) selected from the segment containers (115) where the product segments (140) are stored. The robotic manipulator arms (130) may be affixed to the sides of the assembly table (110) or they may be standalone devices. The robotic manipulator arms (130) and gripping fingers (131) will be operated and controlled by computer control mechanism (180).

FIGS. 8a and 8b show partial detailed views on an embodiment robotic manipulator arm (130) having a plurality of opposing gripping fingers (131). In the embodiment shown, gripping fingers (131) engaged between the link knuckles (143) of a conveyor link segment (141).

The segment containers (115) for the source of product segments may consist of bags, boxes or other similar containers. A conveyor or any other suitable delivery mechanism or device may also be utilized for the source of product segments (140). The source of product segments (140) such as the segment containers (115) will typically be positioned closely proximate to the robotic manipulator arms (130) to maximize their access to the product segments (140).

During assembly of the product-in-assembly (200), the machine visions device (150) may be used to confirm appropriate selection, and guide appropriate placement of the selected product segment (140), such as a link segment (141), to be engaged with the stanchion studs (129) of a desired stanchion (126) or (128) by the robotic manipulator arms (130) prior to insertion of the interlock (145) such as interlock rod (147). The machine vision device (150) may be any suitable machine vision device, such as a device employing one, two or three dimension digital sensors, specialized optics to acquire images, and computer hardware and software to process, analyze, and measure the image characteristics in order to determine the geometry characteristics of a selected product segment (140) and to confirm appropriate selection, and guide appropriate placement of a selected product segment (140). The machine vision device (150) will also be operated and controlled by computer control mechanism (180).

The assembly device (10) may be used to create, manipulate and advance the product-in-assembly (200) from the traction gripper module (120) onto the table (110) or to a storage bin so that additional selected product segments (140) may be linked to the product-in-assembly (200). For a product such as a link-style conveyor belt this is accomplished by raising and moving tire restraining surface (116) of the traction gripper module (120) longitudinally "upstream" or forward from the product segment grippers (125) and the product segment grippers (127). Then the robotic manipulator arms (130) are used to create a first row of link segments (141) by sequentially placing a desired plurality of link segments (141) onto the stanchions (126) of product segment grippers (125) and the stanchions (128) of the product segment grippers (127) to engage studs (129) with the recesses (149) of the link segments (141). The restraining surface (116) may then be lowered and moved longitudinally "downstream" or rearward over the row of link segments (141) just created.

A second row of link segments (141) is then created by using the robotic manipulator arms (130) to manipulate, interweave and aligned the link knuckles (143) of a second row first link segment (141) with link knuckles (143) of a first selected link segment or segments (141) on the first row of link segments (141) and then employing the fastener-insertion device (160) to insert an interlock rod (147) through the aligned second row first link segment (141) and the first selected link segment or segments (141) on the first row of link segments (141). Then, by use of the robotic manipulator arms (130), a second row second link segment (141) is selected and its link knuckles (143) are interweaved and aligned with the link knuckles (143) of a second selected link segment or segments (141) on the first row of link segments (141) and those of the second row first link segment (141). Then employing the fastener-insertion device (160), the previously inserted interlock rod (147) is inserted further through the aligned second row second link segment (141) and the second selected link segment or segments (141) on the first row of link segments (141). This process is then repeated for a second row third link segment (141) and thereafter for additional link segments (141) if desired. This second row of interweaved link segments (141) link segments (141) is not constrained by the restraining surface (116).

The assembly device (10) is then indexed by lowering product segment grippers (127) to disengage its studs (129) from the recesses (149) of the link segments (141). The product segment grippers (125) are then moved longitudinally upstream to move the connected link segments (141) a distance of one link segment pitch. The product segment grippers (127) are then raised to engage its studs (129) with the recesses (149) of the second row of link segments (141). Product segment grippers (125) are then lowered to disengage its studs (129) from the recesses (149) of the connected link segments (141), then moved longitudinally downstream one link segment pitch and then raised to engage its studs (129) with the recesses (149) of the second row of link segments (141). This indexing process is then completed. The sequence of adding link segments (141) is the repeated as desired for creation of a link-style conveyor belt.

The internal logic circuitry and/or external hardware and software necessary to appropriately program, transmit, and control the function of the computer control mechanism (180), the robotic manipulator arms (130), the machine vision devices (150), fastener-insertion device (160), and die lateral gripping surfaces (114) of the device (10) are known in the art. The device (10) will be programmatically capable of coordinating the selection, placement and manipulation of selected product segments (140) in order to produce any desired product either by direct programming of logic circuitry built into the device (10) or by interlacing with an external PLC (programmable logic controller) or standalone personal computer (PC) equipped with appropriate software.

FIG. 9 is a diagram of the method steps for assembly of product comprised of interlocked product segments (140) utilizing the automated assembly device (10) described herein. The method includes a multi-step process commencing with defining (Step 1), determination of the desired product such as a link-style belt conveyor or other product of a desired length and width, composed of appropriate pre-fabricated product segments (140) having appropriate surface geometry to permit manipulation by robotic manipulator arms (130) and traction gripper module (120).

Step 2 requires input of the desired output parameters defined in Step 1, the product length, width, thickness, and composition, into custom software on logic circuitry of the computer control mechanism (180) of the device (10) or on a general-purpose computer to interface with the computer control mechanism (180) of the device (10). For example, a link-style conveyor bell for use as a conveyor of heavy loads in a straight line might require particularly robust segments or multiple interlocking layers of segments to achieve a necessary carrying capacity. A link-style conveyor belt carrying light loads around corners might be constructed with segments permitting variable-radius geometry so that adjacent product segments (140) in sequential rows could separate at the outside of conveyor turns.

Given necessary parameters required by Step 2, and working from a pre-programmed library of available product segments (140) comprising a variety of lengths, widths, thicknesses, materials and surface geometries, the control software in Step 3 determines, first, the type and number of product segments (140) required to assemble the desired product-in-process (200); and, second, the necessary traction gripper module (120) components required. Such determinations may include the number and spacing of the guide fingers (123) required for the guide plate (122), the number, type, and location of the stanchions (126) for product segment gripper (125) and for the stanchions (128) of the product segment gripper (127), and a bill of materials describing type and number of required product segments (140) and interlocks (145) which are then communicated to the user either by the computer control mechanism (180) of the device (10) or, in other embodiments, the external PLC or general-purpose computer running appropriate software.

Step 4 involves user provisioning and assembly of the device (10) including assembly of the table (110), the traction gripper module (120), robotic manipulator arms (130), machine vision devices (150), container (115) and container (148), the restraining surface (116), appropriate product segments (140) and interlocks (145), as communicated in Step 3.

At Step 5, the computer control mechanism (180) of the device (10) or the general-purpose computer interfacing with the computer control mechanism (180) of the device (10) is initialized and runs (controlled by internal or external logic) a setup routine, (Step 5a), for performing the steps of: raising the restraining surface (116), (Step 5b); instructing robotic manipulator arms (130) to select and retrieve product segments (140), (Step 5c); employing the machine vision device (150) (or verifying the correctness of the selected product segments (140). (Step 5d); then employing the robotic manipulator arms (130) for placing the selected product segments (140) in appropriate traction gripper module (120) (depending on desired product), (Step 5e): automated lowering the restraining surface (116), (Step 5f); employing robotic manipulator arms (130) for selecting, retrieving, and placing appropriate additional product segments (140) on appropriate stanchions (126) and stanchions (128) of the traction gripper module (120) in a manner appropriate for the desired product, (Step 5g).

Step 6 consists of employing an assembly routine of the computer control mechanism (180) of the device (10) or the general-purpose computer interfacing with the computer control mechanism (180) of the device (10), repeated as necessary to produce the desired product including employing and using fastener-insertion device (160) for automated insertion of interlocks (145), such as interlock rods (147), to the product segments (140) (either through an entire row or in stepwise/"cascaded" fashion), (Step 6a); employing traction gripper module (120) for automated advancing of the product-in-assembly (200), (Step 6b); and the repeating of (Step 5g) through (Step 6b), as necessary, (Step 6c). Succeeding product segments (140) are loaded sequentially from the "downstream" end of assembly table (110) and traction gripper module (120).

Finally, once the desired product-in-assembly (200) is completed, Step 7 employs advancing and removing the completed product-in-assembly (200) from the assembly table (110) by repeated sequential movements of the appropriate stanchions (126) and stanchions (128) of the traction gripper module (120), and, if desired, into a holding bin placed "downstream" of assembly table (110) into which the product-in-assembly (200) folds as it advances. At the conclusion of Step 7, the automated assembly device (10) is ready to begin an entirely new assembly operation, either of the same product or of another.

What is claimed is:

1. An apparatus for automated manufacture of product assemblies comprised of discrete product segments, comprising:
   a) a plurality of product segments, each of said product segments configured for insertion of an interlock;
   b) a first row of reciprocating product segment grippers and a second row of reciprocating product segment grippers, each of said reciprocating product segment grippers having surface features engageable with said product segments;
   c) at least one robotic manipulation device whereby selected product segments selected from said plurality of product segments may be manipulated to engage said surface features of said first row of product segment grippers to create a first row of product segments and whereby selected product segments selected from said plurality of product segments may be manipulated to engage said surface features of said second row of product segment grippers to create a second row of product segments, whereby said second row of product segments is aligned with said first row of product segments for insertion of an interlock through said first row of product segments and said second row of product segments; and
   d) an interlock inserted through said first row of product segments and second row of product segments to hinge said first row of product segments together with said second row of product segments.

2. The apparatus as recited in claim 1, further comprising a control mechanism employing electronic hardware or software for controlling said robotic manipulating device and said first row and said second row of reciprocating product segment grippers.

3. The apparatus as recited in claim 2, further comprising a machine vision device whereby said at least one robotic manipulating device is guided in selection and location of said selected product segments.

4. The apparatus as recited in claim 3, further comprising a longitudinally extending assembly table adjacent said reciprocating product segment grippers and a longitudinally and vertically positionable retractable vertical restraining surface selectively positionable over said reciprocating product segment grippers whereby either said first row or said second row of reciprocating product segments may be selectively restrained by said retractable vertical restraining surface.

5. The apparatus as recited in claim 4, wherein said first row of reciprocating product segment grippers are independently moveable in a vertical direction and a longitudinal direction with respect to said assembly table and said second row of reciprocating product segment grippers are independently movable in a vertical direction with respect to said assembly table.

6. The apparatus as recited in claim 5, wherein said at least one robotic manipulating device is a computer controlled robotic manipulating device.

7. The apparatus as recited in claim 6, wherein said control mechanism includes electronic hardware or software for receiving inputs describing the product component segments and for communicating with and controlling said machine vision device and said retractable vertical restraining surface.

8. The apparatus as recited in claim 7, wherein said first row of said reciprocating product segment grippers and said second row of said reciprocating product segment grippers include a plurality of stanchions and wherein said surface features engageable with said product segments include a stud whereby said product segments may be engaged.

9. The apparatus as recited in claim 8, wherein said first row of reciprocating product segment grippers and said second row of reciprocating product segment grippers are contained within a housing.

10. The apparatus as recited in claim 9, wherein said housing is mounted on said assembly table.

11. The apparatus as recited in claim 10, further comprising at least one container for storing said product segments prior to use.

12. The apparatus as recited in claim 10, further comprising a guide plate mounted on said housing, said guide plate having a plurality of grip guides, and wherein selected said stanchions of said first row of said stanchions and said second row of said stanchions are positioned within selected said grip guides.

13. An apparatus for automated manufacture of product assemblies comprised of discrete product segments, comprising:
   a) plurality of product segments;
   b) reciprocating product segment grippers having surface features engageable with said product segments;
   c) at least one robotic manipulating device whereby said product segments may be manipulated to engage said product segment grippers;
   d) a machine vision device whereby said at least one robotic manipulating device is guided in selection and location of said product segments;
   e) a retractable vertical restraining surface overlying said product segment grippers wherein said reciprocating product segment grippers include a first reciprocating product segment gripper adapted for independent movement in a vertical direction and a longitudinal direction with respect to said assembly table and a second reciprocating product segment gripper adapted for independent movement in a vertical direction with respect to said assembly table;

f) wherein said reciprocating segment grippers include a plurality of stanchions, each said stanchion having a stud for engaging said product segments;

g) a computer operated control mechanism employing electronic hardware of software for receiving inputs describing said product segments and for communicating with and controlling said robotic manipulating device, said machine vision device, said reciprocating product segment grippers, and said retractable vertical restraining surface;

h) at least one container for storing said product segments prior to use;

i) at least one fastener rod whereby selected said product segments may be linked together to form a hinge; and j) wherein said product segments and said fastener are components of a link-style conveyor belt.

14. An apparatus for automated manufacture of product assemblies comprised of discrete product segments, comprising:

a) a longitudinally extending assembly table;

b) a housing adjacent said assembly table, said housing having an upper surface;

c) a guide plate mounted on said housing, said guide plate having a grip guide row comprised of a plurality of grip guides;

d) a first row of a plurality of reciprocating stanchions and a second row of a plurality of reciprocating stanchions positioned within said housing wherein a reciprocating stanchion of said first row reciprocating stanchions and a reciprocating stanchion of said second row reciprocating stanchions is located within a said grip guide of said plurality of grip guides, each of said reciprocating stanchions having vertically extending surface features, said first row of reciprocating stanchions adapted for independent movement in a vertical direction and a longitudinal direction with respect to said assembly table and said second row of reciprocating stanchions adapted for independent movement in a vertical direction with respect to said assembly table;

e) a plurality of product segments having a top surface and a bottom surface;

f) at least one robotic arm whereby a selected product segment from said plurality of product segments is manipulated to engage said bottom surface of said selected product segment with said vertically extending surface features of a selected reciprocating stanchion of said first row of reciprocating stanchions to create a first row of product segments and whereby a selected product segment from said plurality of product segments is manipulated to engage said bottom surface of said plurality of said selected product segment with said vertically extending surface features of a selected reciprocating stanchion of said second row of reciprocating stanchions to create a second row of product segments;

g) each of said product segments has a link knuckle having a through bore and a recess on said product segment bottom surface;

h) wherein said vertically extending surface features of said each of said reciprocating stanchions includes a stud engageable with said recess on said bottom surface of each said product segment; and i) an interlock rod positioned through said through bores of said link knuckles of said first row of product segments and said through bores of said link knuckles of said second row of product segments whereby said first row of product segments are linked to said second row of product segments.

15. The apparatus as recited in claim 14, further comprising:

j) digital sensors and optics to acquire images whereby said at least one robotic arm is guided;

k) a longitudinally and vertically positionable retractable vertical restraining surface selectively positionable over said first row of reciprocated stanchions and said second row of reciprocating stanchions whereby either said first row or said second row of product segments may be selectively vertically restrained by said retractable vertical restraining surface; and l) at least one computer control mechanism employing electronic hardware or software for receiving inputs and for communicating with and controlling said at least one robotic arm, said digital sensors, said optics to acquire images, said first row and said second row of reciprocating stanchions, and said vertical restraining surface.

16. The apparatus as recited in claim 14, wherein said plurality of product segments and said interlock rod are components of a link-style conveyor belt.

* * * * *